(12) United States Patent
Chamberlain (10) Patent No.: US 6,427,227 B1
(45) Date of Patent: Jul. 30, 2002

(54) SYSTEM, METHOD, AND COMPUTER-READABLE MEDIUM FOR REPAIRING AN APPLICATION PROGRAM THAT HAS BEEN PATCHED

(75) Inventor: Benjamin C. Chamberlain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/261,801

(22) Filed: Mar. 3, 1999

(51) Int. Cl.[7] ................................................ G06F 9/45
(52) U.S. Cl. ............................................. 717/3; 717/11
(58) Field of Search ........... 717/3, 4, 11; 707/200–202, 707/203, 204, 205; 714/2; 713/100

(56) References Cited

U.S. PATENT DOCUMENTS

| | | |
|---|---|---|
| 5,421,009 A | 5/1995 | Platt |
| 5,473,772 A | 12/1995 | Halliwell et al. |
| 5,535,326 A | 7/1996 | Baskey et al. |

(List continued on next page.)

OTHER PUBLICATIONS

Mc Kinney et al., "WinTips Windows 9x", WindowsMagazine, Aug. 1998, pp 255–258.*
Green, "Windows apps need to be aware of install methods", Network World, Nov. 1994, pp 45.*
McNutt, "Administering X Sites", Unix Review, Jul. 1992, start p. 45.*
Methvin, "Problems?In Win98?", Windows Magazine, Oct. 1998, Start p. 224.*
Spanbauer, "Internet Explorer 4.0, problem child", PC World, Jan. 1998, pp 53.*

Kelly, M., "Gain Control of Application Setup and Maintenance with the New Windows Installer," *Microsoft Systems Journal*, Sep. 1998, pp. 15–27.
Dunigan, et al., MCSE Training Guide: Windows NT Workstation 4, New Riders Publishing, pp 28–32, 402 405, 486–492 (1997).
"Automating Microsoft Transaction Server Client Installation," Microsoft Corporation, URL:wysiwyg://MAIN.PRODINFO.6/http://msdn.mi. . . m/library/backgrnd/html/msdn_install.html (Jun. 1997), printed Feb. 29, 2000.
"Seagate Enterprise Management Software–East Announces Release of Desktop Management Suite; Best–of–Breed Point Solutions Integrated to Provide Heterogenous LAN Management," *Business Wire*, p. 04020056 (Apr. 2, 1996).
Kelly, Mike, "Gain Control of Application Setup and Maintenance with the New Windows Installer," *Microsoft Systems Journal*, pp. 15–18, 20–23, 26–27 (Sep. 1998).
Lang, Jay., "IBM Bolsters Windows NT Reliability With Tools Suite," *Information Week*, p. A6ff (Jul. 20, 1998).

*Primary Examiner*—Kakali Chaki
(74) *Attorney, Agent, or Firm*—Michalik & Wylie, PLLC (57) ABSTRACT

A method repairing an installed and patched application program if a patched resource needed by the application program becomes inadvertently deleted or otherwise unavailable to the application program is disclosed. Briefly described, the present invention makes possible a system for verifying the existence of a resource needed to support a feature of the application program. The system may respond to a request from the application program to make use of the resource by first verifying the existence of the resource at an expected location. If the resource does not exist at the expected location, rather than returning an error to the application program, the system reinstalls the missing resource without interrupting the normal operation of the application program. If the resource has been patched since its original installation, the system reapplies the patch to the resource subsequent to reinstalling the resource.

16 Claims, 7 Drawing Sheets

U.S. PATENT DOCUMENTS

| | | | |
|---|---|---|---|
| 5,555,416 A | | 9/1996 | Owens et al. |
| 5,625,823 A | | 4/1997 | Debenedictis et al. |
| 5,630,076 A | | 5/1997 | Saulpaugh et al. |
| 5,644,766 A | | 7/1997 | Coy et al. |
| 5,655,081 A | | 8/1997 | Bonnell et al. |
| 5,659,547 A | | 8/1997 | Scarr et al. |
| 5,692,129 A | | 11/1997 | Sonderegger et al. |
| 5,732,266 A | | 3/1998 | Moore et al. |
| 5,732,275 A | | 3/1998 | Kullick et al. |
| 5,742,829 A | | 4/1998 | Davis et al. |
| 5,752,042 A | | 5/1998 | Cole et al. |
| 5,764,992 A | | 6/1998 | Kullick et al. |
| 5,778,234 A | | 7/1998 | Hecht et al. |
| 5,784,612 A | | 7/1998 | Crane et al. |
| 5,790,664 A | | 8/1998 | Coley et al. |
| 5,790,856 A | * | 8/1998 | Lillich .......................... 717/3 |
| 5,796,967 A | | 8/1998 | Filepp et al. |
| 5,805,897 A | | 9/1998 | Glowny |
| 5,835,911 A | | 11/1998 | Nakagawa et al. |
| 5,859,969 A | | 1/1999 | Oki et al. |
| 5,859,978 A | | 1/1999 | Sonderegger et al. |
| 5,867,713 A | | 2/1999 | Shrader et al. |
| 5,867,714 A | | 2/1999 | Todd et al. |
| 5,870,762 A | | 2/1999 | Lee |
| 5,897,640 A | | 4/1999 | Veghte et al. |
| 5,925,127 A | | 7/1999 | Ahmad |
| 5,930,513 A | | 7/1999 | Taylor |
| 5,933,647 A | | 8/1999 | Aronberg et al. |
| 5,954,827 A | | 9/1999 | Frank et al. |
| 5,960,204 A | | 9/1999 | Yinger et al. |
| 5,978,590 A | | 11/1999 | Imai et al. |
| 5,987,504 A | | 11/1999 | Toga |
| 5,999,740 A | | 12/1999 | Rowley |
| 6,006,034 A | | 12/1999 | Heath et al. |
| 6,006,035 A | | 12/1999 | Nabahi |
| 6,009,274 A | | 12/1999 | Fletcher et al. |
| 6,009,401 A | | 12/1999 | Horstmann |
| 6,021,438 A | | 2/2000 | Duvvoori et al. |
| 6,023,586 A | | 2/2000 | Gaisford et al. |
| 6,029,147 A | | 2/2000 | Horadan et al. |
| 6,041,333 A | | 3/2000 | Bretschneider et al. |
| 6,067,582 A | | 5/2000 | Smith et al. |
| 6,131,192 A | | 10/2000 | Henry |
| 6,151,643 A | * | 11/2000 | Cheng et al. .................. 710/36 |
| 6,151,708 A | * | 11/2000 | Pedrizetti et al. ............. 717/11 |
| 6,161,218 A | * | 12/2000 | Taylor ......................... 717/11 |

* cited by examiner

SYSTEM, METHOD, AND COMPUTER-READABLE MEDIUM FOR REPAIRING AN APPLICATION PROGRAM THAT HAS BEEN PATCHED

FIELD OF THE INVENTION

The present invention generally relates to computer software application programs for providing to other installed application programs the ability to repair missing program files. More particularly, the present invention relates to verifying the existence of a program file at an expected location.

BACKGROUND OF THE INVENTION

Before use, an application program must typically be installed to a computer system. The installation procedure generally involves copying executable and data files (the "program files") related to the application program from a source location to an installed location on the computer system. Typically, the source location is an installation disk or location on a network drive accessible by the computer system. Often the program files are stored in a compressed format to conserve storage space.

Today, application programs use a variety of installation technologies to copy the program files from the source location to the computer system. Most often, an application program will include a special application program (the "set-up program") for administering and performing the installation procedure. Generally, the set-up program is unique to the application program and is customized to install the program files from the source location to pre-configured locations on the computer system. Often the user is provided the option of redirecting the installation of the program files to other locations on the computer system.

The typical set-up program not only installs the program files to the computer system, but also creates entries in a central registration database, such as a system registration database (the "system registry"), which identify the locations of the program files on the computer system. The location may be identified by a "path" to a particular directory or folder of the computer system in which reside the program files. The entries in the system registry are typically maintained by the application program itself. While executing, the application program generally queries the system registry for the path to an installed program file, and then accesses the installed program file at the path identified in the system registry. Any changes to the entries in the system registry are governed by the application program.

Another installation technology, often called "patching," refers to installing new program files or modifying current program files after the application program is installed. Generally speaking, after the application program is installed, a patch may be applied to update the application program or a program file to a newer revision than that installed. Typically patches are used to correct programming bugs in the associated application program. New program files may be added, current program files may be altered or deleted, and registry entries may be created, removed, or changed by the patch. Traditionally a patch is applied to the installed application program independently of the set-up program.

Current installation technologies perform satisfactorily if the program files are never inadvertently deleted or moved from their installed locations. As mentioned, the start-up program or patch creates entries in the system registry which define the path to the installed program files. Installation technologies today do not include a mechanism for verifying the installed state of the program files or registry keys after installation. In addition, current installation technologies do not include the ability to verify the existence of a program file after it has been installed, for instance at run-time of the application program.

One problem plaguing software developers is the over-zealous computer user. Often, the over-zealous user, in an attempt to minimize disk space usage on the computer system, may delete a program file with which the user is unfamiliar. Likewise, the over-zealous user may attempt to rearrange the file structure of the computer system by moving the program files after installation. Unfortunately, existing installation technologies do not include the ability to identify and repair the situation where a program file is expected to be at an installed location but is no longer at that location.

Currently, when an application program queries the system registry for the path to a program file, the operating system performs a simple table look-up in the system registry and returns the path to the program file. However, no verification is performed to ensure that the program file still exists at the path originally written by the set-up program or patch. The operating system acts as a simple database look-up engine. If a program file is inadvertently deleted, it will go undetected until needed. Consequently, the application program may attempt to launch or access the program file at the path and receive an error message indicating that the program file is unavailable.

In such a situation, the application program is typically unable to continue functioning properly and may generate an error prompting the user to perform a reinstallation of the application to repair the missing program file. In that case, the user is forced to terminate the current process and handle the error before continuing. The normal operation of the application program is interrupted, and the user may be greatly inconvenienced until the dilemma of the missing program file is resolved.

Thus, existing installation technologies fail to support the ability to repair an application program if a requested program file becomes deleted or otherwise unavailable at the program file's installed location. Accordingly, there is a need in the art for a system and method for installing an application program which provides the ability to efficiently resolve the situation where an installed program file becomes inadvertently unavailable to the application program. In addition, there is a need in the art for a system and method for verifying the existence of an installed program file upon an indication by the application program that the program file is needed. Moreover, there is a need in the art for a system and method for providing an application program with the ability to install a missing program file in a background process that does not terminate the application program's current process. Still further, there is a need in the art for a system and method for ensuring the existence of a program file needed by the application when the program file was added to the application after the original installation of the application.

SUMMARY OF THE INVENTION

The present invention meets the above-described needs by providing the ability to identify a missing program file necessary to an application program, and to install the missing program file without interrupting the operation of the application program. The present invention achieves that result by receiving an indication that a resource, such as a program file or registry key, is needed by the application program. The indication may take the form of a request for the location of the needed resource. The present invention may maintain a listing of the locations of the resources needed by the application. In response to the indication, the present invention verifies the existence of the needed resource prior to the application attempting to execute the resource. The verification may be achieved by querying for the existence of the resource at the location maintained in the listing. If the resource does not exist, the present invention initiates the installation of the resource. The installation may occur in a background process without interrupting the application program, or by prompting the application program for instructions whether to install the missing resource.

In one embodiment, when an application program is installed or patched, an installer application stores information in a registration database (the "installer registry") related to the locations of the application program's resources, such as program files and registry keys, and if a patch has been applied to the application program. The installer registry may be a portion of the general system registry, or the installer registry may be a stand-alone registration database. A resource identifier may be assigned to each resource to uniquely identify that resource from other resources. Within the installer registry, the location of each resource may be associated with the resource identifier for that resource.

To invoke a particular "feature," the application program indicates to the installer application which feature to invoke by passing to the installer application a resource identifier for a resource needed by that feature. A "feature" is a granular piece of the product that a user may choose to install or execute. Features typically correspond roughly to the functional features of the program itself, such as a proofing tools feature or a word processing feature. Invoking the feature may constitute selecting an option from the menu, querying the installer application to identify which features of the application program are installed, or other methods for invoking the feature as will be understood by those skilled in the art.

The resource identifier passed to the installer application may take the form of a "token," which may include one or more of the following arguments: an identifier for the application program (the "Product Code"), an identifier for the invoked feature (the "feature identifier"), or an identifier for a "component" related to the resource needed by the feature (the "Component Code"). A "component" is a collection of resources, such as files, shortcuts, or registry keys, that are all installed or uninstalled as a unit. Components are the building blocks of the program that are not exposed to the user. Alternatively, the resource identifier may take the form of a "descriptor," which may include similar information to the token, but formatted to be more easily interpreted by the installer application.

Again in one embodiment, passing the resource identifier may include issuing an application programming interface ("API") call, with the resource identifier as a parameter, to the installer application in the form of a request for the location of the resource identified by the resource identifier. In response to receiving the API call, the installer application first accesses the installer registry and retrieves the location of the resource associated with the resource identifier. The installer application then verifies the existence of the resource at that location. If the resource exists at the location, the installer application returns the location to the application program. The application program then accesses the resource at the location. However, if the installer application fails to verify the existence of the resource at the location, the installer application initiates a repair procedure.

The repair procedure may take two forms. A "brute force" repair procedure may be used, generally if the application program is an operating system function or service, such as a shortcut maintained by the operating system. In that case, the installer application may automatically execute an installation procedure to install the resource. Installing the resource may include prompting a user for a "source" which contains the program files for the application program, retrieving the program files from the source, writing the program files and other resources to the appropriate location. If the installer application detects, from an entry in the installer registry, that a patch exists for the affected program files or resources, the installer application re-applies the patch to those affected program files or resources. Processing may then return to the application program by passing the location of the newly-installed resource to the application.

Another repair procedure may also be invoked, generally for conventional application programs. Rather than automatically executing the installation procedure, the installer application may return a message to the application program that the resource does not exist at the expected location. The application program may then choose from several alternatives to handle the message. For instance, the application program may prompt the user to choose whether to install the missing resource, or the application program may be pre-configured to automatically execute the installation procedure for certain missing resources. If the choice is made to install the missing resource, the application program indicates that choice to the installer application. The installer application then executes the installation procedure in the same fashion as that described above, and the missing resource is reinstalled.

In that manner, if a resource becomes deleted or otherwise not available at an expected location, rather than the application program being forced to quit, or execute with unstable characteristics, the absence of the missing resource is detected, and it may be installed either automatically (without user or application program input) or only if desired.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to a system and method for providing the ability to repair an installed application program if a resource needed by the application program becomes inadvertently deleted or otherwise unavailable to the application program. Briefly described, the present invention makes possible a system for verifying the existence of a resource needed to support a feature of the application program. The system may respond to a request from the application program to make use of the resource by first verifying the existence of the resource at an expected location. If the resource does not exist at the expected location, rather than returning an error to the application program, the system may initiate an installation procedure for restoring the missing resource without interrupting the normal operation of the application program.

Exemplary Operating Environment

Figure 1:
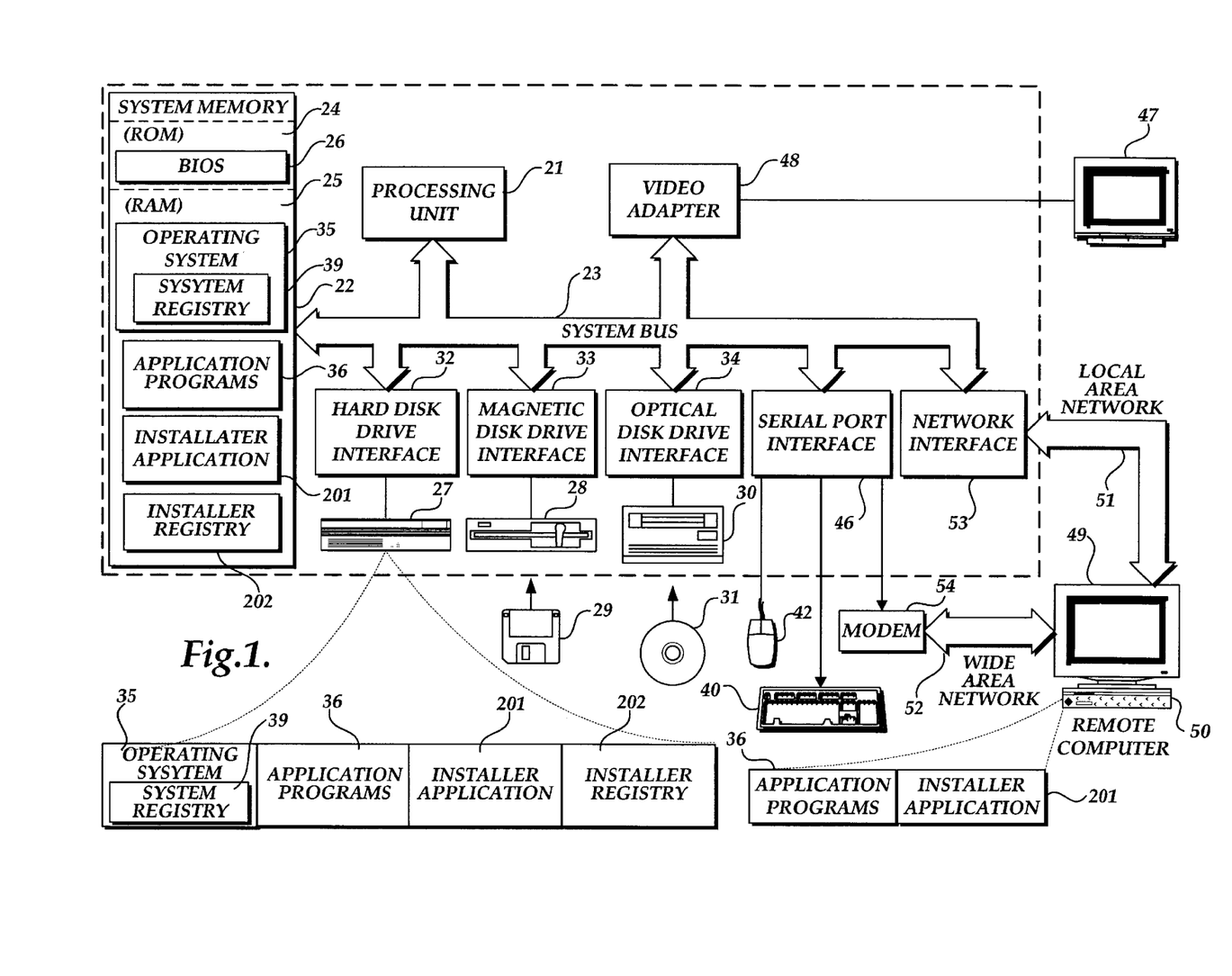
FIG. 1 is a block diagram of a conventional personal computer that provides a portion of the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules, such as an installer application 201 formed in accordance with an exemplary embodiment of the present invention, and program data, such as an installer registry 202 associated with the installer application 201. The operating system 35 may include a system registry 39. In this embodiment, the invention may reside within the installer application 201 and the installer registry 202. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It will be appreciated that the network connections shown are exemplary and other means of establishing a communications link between the computers may be used.

Discussion of Terminology

Before discussing the details of the installer application 201, a brief discussion of terminology is needed. In accordance with an exemplary embodiment of the invention, the installer application 201 recognizes three principal elements: products, features, and components. A "product" represents a single, entire application program, such as the Microsoft Word application program marketed by Microsoft Corporation of Redmond, Wash. Each product has a globally unique identifier ("GUID") known as a Product Code which allows products to be distinguished. Each product is made up of one or more features. A "feature" is a granular piece of the product that a user may choose to install or execute. Features typically correspond roughly to the functional features of the product itself, such as a "Proofing Tools" feature or a "Word" feature. Each feature is essentially a grouping of components and may also include other features. Features need not be globally unique, and therefore may be identified by any appropriate means, such as with a textual feature identifier.

The term "component" is used to identify a collection of resources, such as program files and registry keys, that are all installed or uninstalled as a unit. Components are the building blocks of the product that are not exposed to the user. A resource, such as a program file or a registry key, may be part of only one component. Two components may not share the same resource whether they are part of the same product or parts of different products. Each component has a GUID known as a Component Code. One program file within the component is designated as a "key file." The key file is the principal program file of the component and may be used to represent the component.

Figure 2:
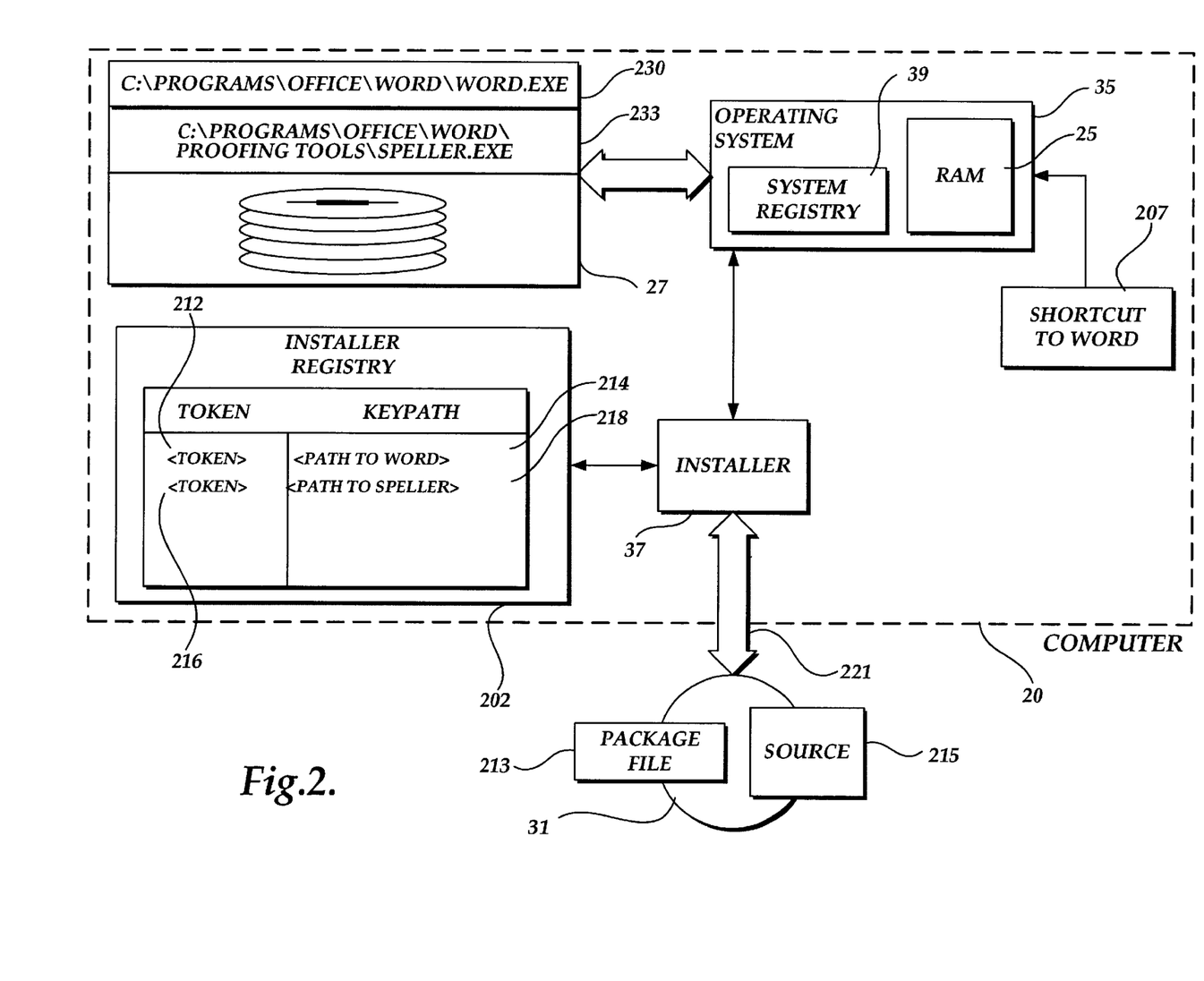
FIG. 2 is a functional block diagram of the conventional personal computer of FIG. 1, including an installer application constructed in accordance with an exemplary embodiment of the present invention.

FIG. 2 is a functional block diagram of a computer environment making use of an installer application 201 constructed in accordance with an exemplary embodiment of the present invention. A computer is illustrated, such as conventional personal computer 20, including the installer application 201, an installer registry 202, an operating system 35, a hard disk drive 27, a "shortcut" 207. Each of those items is described and discussed in greater detail below.

Also illustrated are a package file 213 and a source 215. The package file 213 and the source 215 may reside on a CD-ROM disk 31 accessible to the computer 20 via an optical disk drive 30 and over transmission path 221. The package file 213 and the source 215 may also exist in any other location accessible by the computer 20. The package file 213 and the source 215 are discussed in further detail below. The functionality and construction of the installer application 201 is best described by example, through the installation, patching, and execution of a product.

Example of Installation Procedure

To begin the example, a user initiates the installation of the product, such as the Microsoft Word application program. Initiating the installation may constitute the act of inserting CD-ROM disk 31 in optical disk drive 30, or the act of executing a remote startup script over a network connection, or any other means of initiating the installation. Once the installation is initiated, the installer application 201 assumes control of processing.

The installer application 201 begins the installation by reading the package file 213 into memory, such as RAM 25. The package file 213 is unique to the product and is essentially a database which describes, among other things, the relationships between the features, components, and resources of the product. The package file 213 may include the unique identifiers assigned to each of the features and components of the product.

The installer application 201 reads the package file 213 and uses the information stored within to determine the installation operations that must be performed for the product. For instance, the installer application 201 may display a dialog box which presents the user with the option of selecting which features of the product to install. The user may be presented with the option of selecting a "Word" feature, a "Drawing" feature, and a "Proofing Tools" feature. The user may then select which features to install to the computer 20. As discussed above, a feature is a grouping of components, and the components identify the actual resources to be installed to the computer 20. Accordingly, once the user has selected the desired features of the product, the installer application 201 resolves those features into a listing of components to be installed.

The source 215 contains the actual resources associated with the components. The source 215 may also include a reference table to identify the associations between the resources and the components. Those components making up the selected features are copied from the source 215 to an appropriate location on the computer 20, such as to the hard disk drive 27 or to a system registry 39 maintained by the operating system 35. As mentioned above, a component is a collection of resources, such as program files, shortcuts, or registry keys. Those skilled in the art will recognize that the phrase "reading the component" may actually refer to reading the resources associated with the component. Likewise, the phrase "writing the component" may refer to writing the resources associated with the component. However, for simplicity only, this discussion may use the terms reading, writing, or copying components interchangeably with performing those actions on the underlying resources.

The appropriate location for a component on the computer 20 may depend upon the type of resources associated with the component. For instance, program files associated with the component are stored in the file system of the hard disk drive 27. However, registry keys associated with the component are stored in the system registry 39. If the user identifies a particular location within the file system of the hard disk drive 27 for a feature, then the installer application 201 will write the program files of components associated with that feature to that particular location.

When a component is written to the appropriate location, the installer application 201 creates an entry in the installer registry 202 corresponding to the component. The entry includes a "keypath" for the component, and an identifier for the component, termed a "token." In the disclosed embodiment, the token includes the following arguments: the Product Code of the product installing the component, the feature identifier of the feature containing the component, and the Component Code of the component. Those skilled in the art will appreciate that systems may be designed in which tokens include more or fewer arguments. The term "token" as used herein refers to any identifier capable of uniquely distinguishing one component from other components, or one feature from other features.

Also in the disclosed embodiment, the keypath may be a path in the file system where the component is actually stored. More precisely, the keypath to a component may be the path to the component's key file, or the keypath to a component may be a registry entry. For instance, in the disclosed example, the product installed may include a "Program Files Feature" having a "Word Executable Component." The Word Executable Component may have the key file "word.exe" 230. The Word product may also include a "Proofing Tools Feature," which may be a subfeature. The Proofing Tools Feature may include a "Spelling Component." The Spelling Component may have the key file "speller.exe" 233.

Continuing with the example, the Word Executable Component may be installed to the location on the hard disk drive 27 identified by the path "C:\Programs\Office\Word\." Accordingly, the key file word.exe 230 is written to that location, and an entry in the installer registry 202 includes a token 212 identifying the Word Executable Component and the keypath 214 to the key file word.exe 230. In a similar manner, the Spelling Component may be written to the path "C:\Programs\Office\Word\Proofing Tools\," and an entry in the installer registry 202 may be created with a token 216 identifying the Spelling Component, and a keypath 218 to the key file speller.exe 233. It should be noted that the keypath 218 actually identifies the location of the key file speller.exe 233, which corresponds to the location of the Spelling Component. It should be repeated that a key file is simply one program file selected to represent a component. In certain circumstances, the key file may also be a registry key in the system registry 39.

The installer application 201 continues with the installation process until all of the components making up the selected features are written to the appropriate locations on the computer 20. When all of the components are written, installation is complete and the installer registry 202 is populated with an entry for each installed component. Each entry includes an identifier for the component (the token) and a keypath identifying the location at which the component is stored.

Example of Applying a Patch

Figure 3:
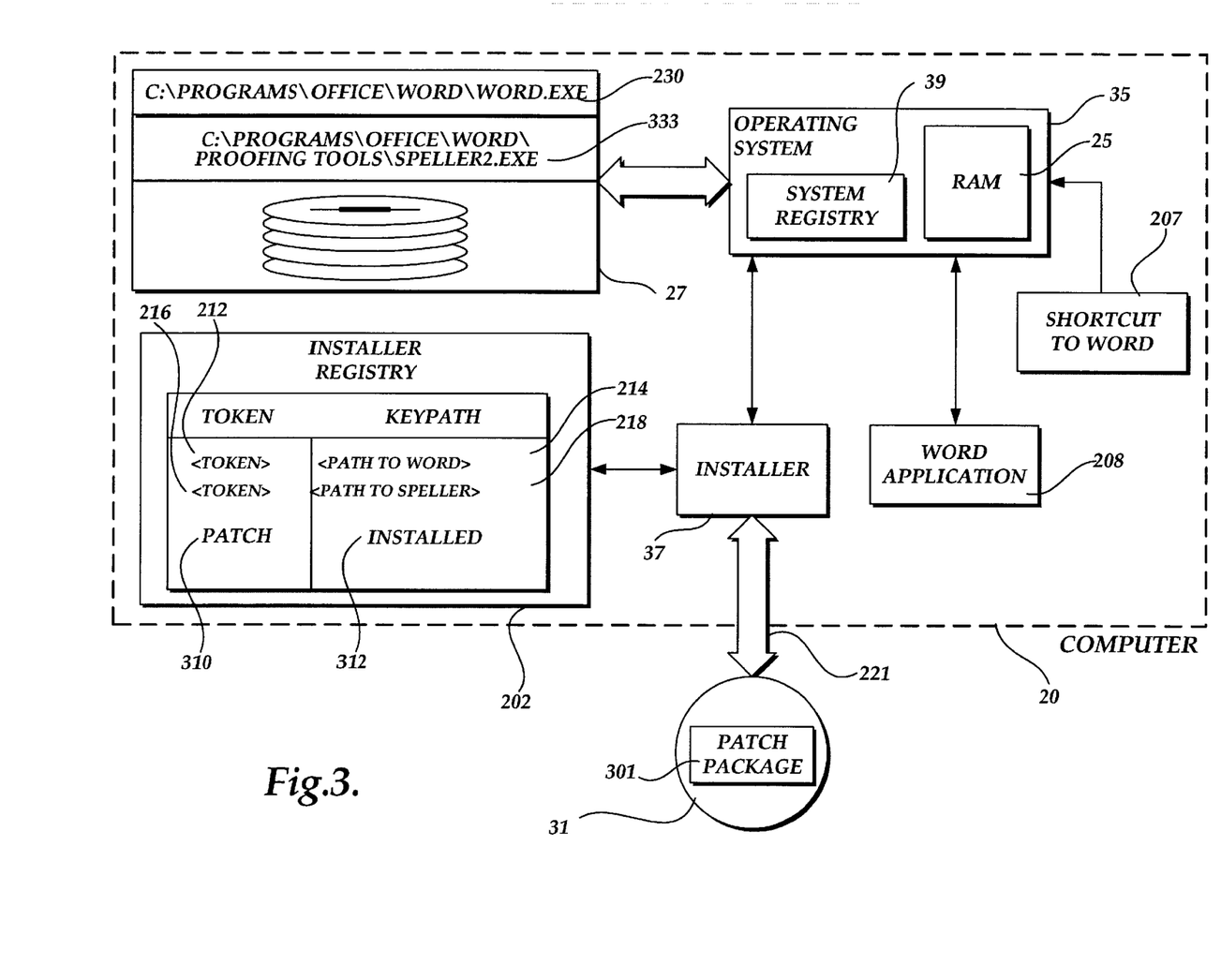
FIG. 3 is a functional block diagram of the installer application of FIG. 2, and associated programs and resources, for applying a patch to an installed product.
Figure 4:
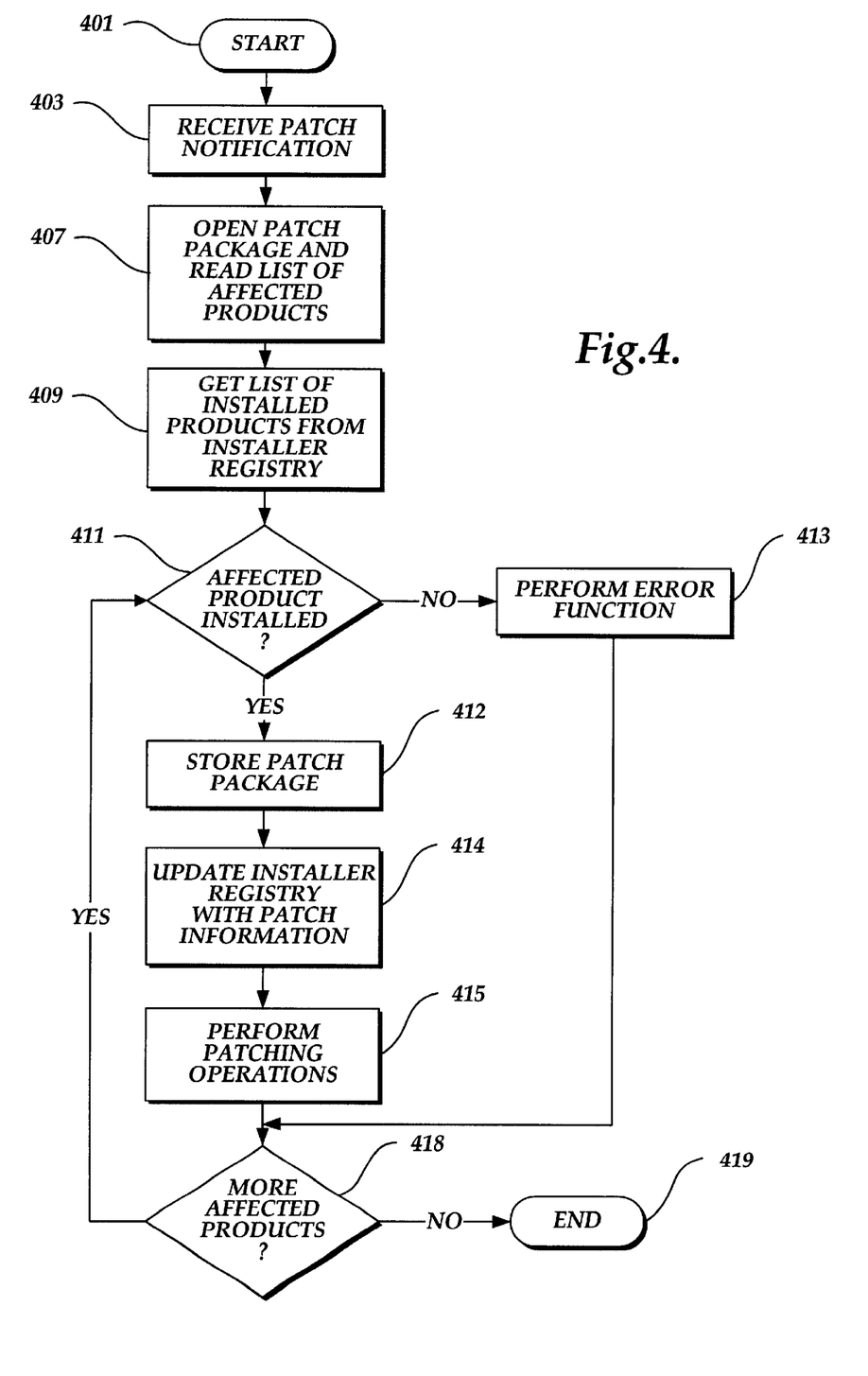
FIG. 4 is a logical flow diagram depicting the steps performed by the installer application constructed in accordance with one embodiment of the invention to apply a patch to an installed application.

On occasion, after a product is installed there arises a need to revise, through a patch, certain resources of the product, typically to fix a programming bug or error. FIG. 3 is a functional block diagram illustrating how, in accordance with the invention, a patch is applied to an installed product, such as the Microsoft Word application program installed in the example illustrated by FIG. 2. FIG. 4 is a logical flow diagram depicting the steps performed by the installer application 201 to apply the patch. FIG. 4, taken in conjunction with FIG. 3, illustrate the steps performed by the installer application 201 to apply a patch to an installed product.

The process begins at step 401 of FIG. 4 where the user has acquired a patch package 301. The patch package 301 contains updated resources, such as new program files, registry key values, or patch bits to alter existing program files, that are used to revise the installed product. In addition, the patch package 301 contains information for use by the installer application 201 to incorporate the updated resources into the installed product. The patch package 301 may reside on a CD-ROM Disk 31, on the hard disk drive 27 of a computer 20, or in any other suitable location. Alternatively, users may download the patch package 301 from a location on the Internet. Once the user has acquired the patch package 301, the user launches the patch package 301 and processing continues at step 403.

At step 403, the installer application 201 receives a notification that the patch package 301 has been launched. For instance, the patch package 301 may include software code or routines that, when triggered by the user, issue to the installer application 201 an instruction to apply the patch. One example of such a notification may be an Application Programming Interface ("API") call instructing the installer application 201 to apply the patch. When the installer application 201 receives the notification, processing continues at step 407.

At step 407, the installer application 201 opens the patch package 301 and reads a list of affected products from the information contained in the patch package 301 and identifies which products are affected by the patch. The patch package 301 may apply to more than one product. Products may be identified in the patch package 301 by a product code or other identifier uniquely distinguishing each product affected by the patch. Processing continues at step 409.

At step 409, the installer application 201 reads the information stored in the installer registry 202 to identify a list of products installed on the computer 20. As mentioned previously, when the installer application 201 installed the product, the product code for that product was stored in the installer registry 202. Alternatively or in addition, the product code may be stored in, and retrieved from, the system registry 39.

The installer application 201 may read all of the information in the installer registry 202 related to the installed products, or may read only enough information to identify which products are installed and the versions of those products. The installer application 201 may additionally retrieve information related to which of several features of a product are installed, and whether any features are configured to be installed upon first use. Although this example deals with only one installed product, it should be appreciated that several products may be installed and reflected in the installer registry 202 and the system registry 39. Processing then continues at decision block 411.

At decision block 411, the installer application 201 queries whether affected products are installed. It is possible that the user has downloaded and attempted to apply a patch that does not affect any installed product. The installer application 201 may compare the current product from the list of affected products from step 407 above with the list of installed products from step 409. On the first pass through decision block 411, the current product is the first product in the list of affected products. If the current product is not installed, processing continues at step 413 where an error function is performed. The error function may include notifying the user that the current product is not installed, or any other acceptable error function. Alternatively, the error function may be to do nothing, i.e., simply continue processing without notifying the user. Processing then proceeds to step 418. If, however, the current product is installed, the decision block 411 returns a positive indication and processing proceeds to step 412.

At step 412, the installer application 201 begins applying the patch by copying the patch package 301 to a predetermined location on the hard disk drive 27 of the computer 20. By storing it on the hard disk drive 27, the patch package 301 is available for future installation or patching operations, such as the self-repairing function described below. The location may be a particular folder on the hard disk drive 27, such as a WINDOWS folder (not shown) containing program files for the operating system 35. With the patch package 301 stored, processing continues at step 414.

At step 414, the installer application 201 updates the installer registry 202 to reflect the existence of the patch, and to reflect the proper installed state of the product after the patch has been applied. For example, the installer application 201 may add a patch entry 310 in the installer registry 202 indicating the existence of the patch. A value 312 associated with the patch entry 310 may indicate that the patch is installed for the product. The token 216 associated with the key file speller.exe 233 may possibly be modified to reflect a newer version of the key file, i.e., key file speller2.exe 333 (discussed below). Other entries may also be added to the installer registry 202, such as tokens and paths to new program files added by the patch, a patch source list to indicate alternative source locations for the patch package 301 for future operations, and other entries as will become apparent to those skilled in the art upon a thorough study of this disclosure.

Updating the installer registry 202 to reflect the patch allows the installer application 201 to continue to provide post-installation support to the installed products while also providing that support to components of the product either added or modified by the patch. Processing proceeds to step 415.

At step 415, the installer application 201 performs the patching operations necessary to apply the patch to the installed product. The patching operations may include adding new program files to the installed product, altering existing program files associated with components of the product, modifying entries within the system registry 39, or other patching operations. For a complete discussion of the patching operations and steps performed by an installer application to apply a patch to an installed product, see U.S. patent application Ser. No. 09/261,864, entitled System and Method for Patching an Installed Application Program, filed concurrently herewith and assigned to the same assignee as the present application, the subject matter of which is incorporated herein by reference. For example, if the patch package 301 includes patch bits for revising the key file speller.exe 233, the installer application 201 incorporates the patch bits into the key file speller.exe 233 to create a revised key file speller2.exe 333. Those skilled in the art will appreciate that the name of a program file, such as "speller.exe," is generally not changed when patch bits are applied. However, to avoid confusion, this discussion uses the name "speller2.exe" to refer to the patched version of the key file speller.exe 233. Because patch bits were merely applied to key file speller.exe 233 to create key file speller2.exe 333, the keypath 218 associated with the key file speller.exe 233 continues to identify the location of key file speller2.exe 333. Once the patching operations are complete at step 415, processing proceeds to decision block 418.

At decision block 418, a determination is made whether another product remains to be patched. If there remains a product on the list of affected products from step 409 above, the installer application 201 may increment the current product to the next product on the list, and processing loops back to step 411 where the process repeats as described above. If no further products remain to be patched, processing proceeds to ending step 419 where the process terminates.

To review, the installer application 201 installed the features of the product selected by the user at installation. The components making up those selected features were written to appropriate locations on the computer 20. For instance, a Word Executable Component and a Speller Component were written to the file system of the hard disk drive 27. As discussed above, installing those components may include writing the key files of those components to a keypath location in the file system of the hard disk drive 27. A patch was applied to the installed product to revise certain resources of the product. In the disclosed example, patch bits were incorporated into the key file speller.exe 233, thereby creating key file speller2.exe 333, to repair a programming bug. Entries indicating the existence and location of the patch package 301 were also created in the installer registry 202. And entries in the installer registry 202 created during installation were modified to properly reflect the patched state of the product.

Example of Product Execution

The following discussion, taken in conjunction with FIG. 3, gives an overview of the functionality of the installer application 201 once the product is installed and patched. The product includes a shortcut 207 to the Word Executable Component. The shortcut 207 is an operating system 35 service which allows indirect access to a resource stored on the hard disk drive 27. A shortcut is sometimes referred to as an "alias." The shortcut 207 is generally presented to the user as an icon or file which, when activated, launches an executable file associated with the shortcut 207. In the disclosed example, the shortcut 207 is associated with the Word Executable Component such that activating the shortcut 207 causes the operating system 35 to launch the executable file associated with the Word Executable Component, in this case the key file word.exe 230.

When the user activates the shortcut 207, the operating system 35 first creates a shell or process within which the executable file will execute. In accordance with the disclosed embodiment, activating the shortcut 207 causes the operating system 35 to query the installer application 201 for the keypath to the executable file associated with the shortcut 207, in this case the keypath 214 to the key file word.exe 230. The operating system 35 may query for the keypath 214 by calling the installer application's 201 "Provide Component" call with a parameter identifying the Word Executable Component. In the disclosed embodiment, the parameter may be a token which includes a Component Code to uniquely identify the Word Executable Component. The Component Code is a GUID to distinguish the Word Executable Component from other components, such as the Spelling Component. The token may also include a Product Code to uniquely identify the product as the Microsoft Word application program. The Product Code may likewise be a GUID to distinguish the Microsoft Word product from other products. In addition, the token may include a feature identifier to identify the Program Files Feature. The feature identifier may be a GUID or it may be a textual identifier associated with the feature. One example of such a token may take the following form:

[{FC5A4660-479C-11d1-883B-0080C7A271D8};
{"Program Files"};
{DT3E1967-517K-33d1-294G-0060C3A747G4}]

where the phrase "{FC5A4660-479C-11d1-883B-0080C7A271D8}" is the Product Code for the Microsoft Word product, the phrase "Program Files" is the feature identifier for the Program Files Feature, and the phrase "{DT3E1967-517K-33d1-294G-0060C3A747G4}" is the Component Code for the Word Executable Component.

In response to the Provide Component call, the installer application 201 queries the installer registry 202 for the keypath 214 associated with the token 212. The installer application 201 then verifies that the keypath 214 exists in its specified location, and if so, returns the keypath 214 to the shortcut 207, which in turn prompts the operating system 35 to execute the key file word.exe 230 at the location identified by the keypath 214. As discussed above, the key file word.exe 230 is stored on the hard disk drive 27 under the folder "C:\Programs\Office\Word\."

The operating system 35 executes the key file word.exe 230 from the location identified by the keypath 214. The key file word.exe 230 then assumes control of the shell created by the operating system 35. While the key file word.exe 230 is executing, it is referred to as the "Word application" 208. The Word application 208 may then perform a startup procedure and continue loading. For instance, the Word application 208 may issue an "Enumerate Features" call to the installer application which returns all of the available features at once. Alternatively, the Word application 208 may issue a series of "Query Feature State" calls to the installer application 201 to individually identify which features of the Word application 208 are installed. In response to either call, the installer application 201 may query the installer registry 202 to identify whether a particular feature of the Word application 208 is installed, and return that information to the Word application 208. The Word application 208 may perform such calls in order to populate a menu bar or toolbar of the Word application 208. Once the startup procedure is complete, the Word application 208 is available for use by the user.

During operation, the user may select a particular feature of the Word application 208 for activation. For instance, the user may select a "spell check" option from the menu bar or toolbar of the Word application 208. In response to such a selection, the Word application 208 may query the installer application 201 for the keypath to the component or components necessary to support the feature. For instance, in the disclosed example, a Spelling Component may be necessary to support the feature associated with the "spell check" option of the Word application 208. In that case, when the user selects "spell check," the Word application may pass a "Provide Component" call to the installer application 201 along with the (patched) token 216 identifying the Spelling Component.

In response to the Provide Component call, the installer application 201 may verify the installed state of the calling feature identified in the token, and provide the keypath to the component identified in the token. In this example, the key file of the Spelling Component is the (patched) key file speller2.exe 333. Consequently, when the installer application 201 receives from the Word application 208 a Provide Component call with a token 216 identifying the Spelling Component, the installer application 201 queries the installer registry 202 for the keypath 218 associated with that token 216. The installer application 201 then returns the keypath to the Word application 208, which instructs the operating system 35 to execute the speller2.exe 333 key file at the location identified by the keypath. Once the operating system 35 has launched key file speller2.exe 333, the Speller Component is available to the Word application 208. In this manner, the Word application 208 may query the installer application 201 each time the user attempts to activate another feature, and the installer application 201 returns the keypath for the appropriate component.

The foregoing has been a general overview of the functionality of an installer application 201 which may benefit from an exemplary embodiment of the present invention. The discussion will now explain in greater detail the aspect of repairing an application program if a key file is inadvertently deleted or otherwise becomes unavailable to the application program at the keypath location.

Repairing a Missing Resource

Figure 5:
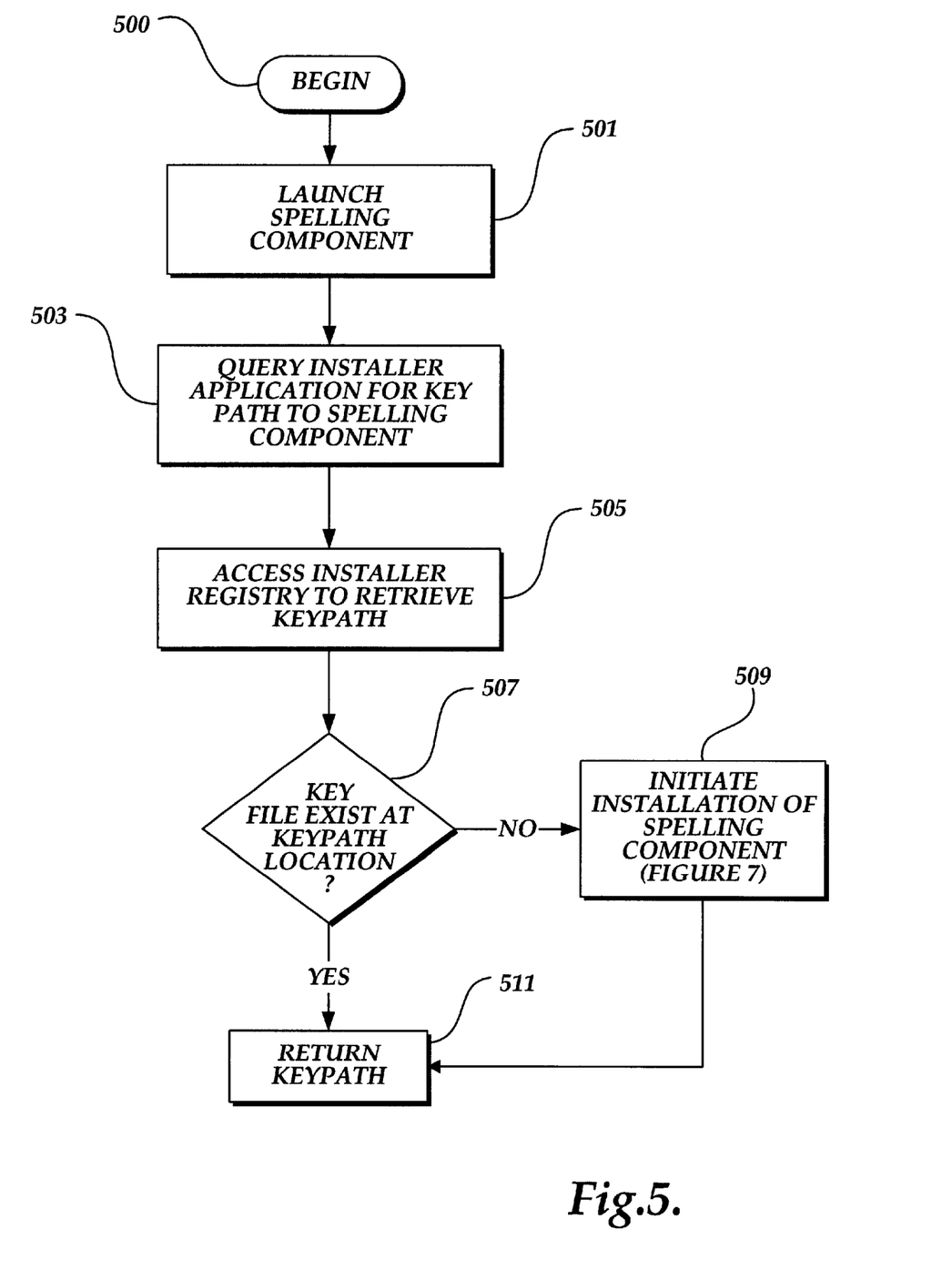
FIG. 5 is a logical flow diagram depicting a process for verifying the existence of installed resources, and for installing any inadvertently missing resources in accordance with an exemplary embodiment of the present invention.

FIG. 5 is a flow chart which, taken in conjunction with FIG. 3, illustrates, in general, steps performed by the installer application 201 of the disclosed embodiment to verify the existence of the installed resources of an executing product, such as the Word application 208, and to install any inadvertently missing resources. The process starts at beginning step 500 where the Word application 208 has been installed to the computer 20. As discussed above, during the installation process, the features and components of the Word application 208 are installed to appropriate locations on the computer 20. For example, the key file word.exe 230 of the Word Executable Component is installed at the location identified by the keypath "C:\Programs\Office\Word\." That keypath 214 is stored as an entry in the installer registry 202 and associated with the token 212 corresponding to the Word Executable Component.

In addition, the key file speller.exe 233 of the Spelling Component has been installed at the location identified by the keypath "C:\Programs\Office\Word\Proofing Tools\." That keypath 218 is written to an entry in the installer registry 202 and associated with the token 216 corresponding to the Spelling Component. Moreover, the key file speller.exe 233 has been patched and now exists as speller2.exe 333. Processing continues at step 501, where the Word application 208 is executing in the RAM 25 of the computer 20.

At step 501, the Word application 208 is executing in memory. As discussed above, features associated with the Word product are available to the Word application 208 while executing. One such feature may be the Proofing Tools Feature. Included in that feature is the Spelling Component, which provides the user with the ability to check the spelling of words in a document. In response to the user selecting a "spell check" option from the menu, the Word application 208 may attempt to launch the Spelling Component to service the user's selection. If so, then processing continues to step 503.

At step 503, the Word application 208 begins to launch the Spelling Component by querying the installer application 201 for the keypath 218 to the Spelling Component. The query may take the form of an API call to the installer application 201, as discussed in greater detail below with respect to FIG. 4. The Word application 208 includes, as a parameter of the call, the token 216 identifying the Spelling Component. Processing then continues at step 505.

At step 505, in response to the query from the Word application 208, the installer application 201 accesses the installer registry 202 to retrieve the keypath 218 associated with the token 216 identifying the Spelling Component. When the installer application 201 has retrieved the keypath 218 to the Spelling Component, processing continues at decision block 507.

At decision block 507, the installer application 201 verifies the existence of the Spelling Component at the location defined by the keypath 218 prior to returning the keypath 218 to the Word application 208. Verifying the existence of the Spelling Component may include querying the operating system 35 for the existence of key file speller2.exe 333 at the location identified by the keypath 218. Verifying the existence of key file speller2.exe 333 prior to returning the keypath 218 to the Word application 208 helps to ensure that the Word application 208 will not receive an error when attempting to launch the Spelling Component. If key file speller2.exe 333 is not missing, processing continues to step 511, where the keypath 218 is returned to the Word application 208. If key file speller2.exe 333 is missing or otherwise unavailable, processing continues at step 509.

At step 509, the installer application 201 installs (or more precisely, reinstalls) the Spelling Component. In the disclosed embodiment, installing the Spelling Component may include re-installing the entire feature in which the Spelling Component is contained. The installation of the Spelling Component may be performed automatically, without user intervention or knowledge. Alternatively, the query sent to the installer application at step 503 may include a parameter indicating that the installer application 201 should not automatically install any missing components, but rather suspend processing and allow the Word application 208 to prompt the user for instructions. The step of installing the Spelling Component is illustrated in detail with respect to FIG. 7 and described below. After the missing Spelling Component has been installed, processing continues at step 511.

At step 511, the missing Spelling Component has been installed and its existence verified. Thus, the installer application 201 returns the keypath 218 to the Word application 208. The Word application may then proceed to launch the Spelling Component in the ordinary manner, such as by prompting the operating system 35 to execute key file speller2.exe 333 at the location identified by the keypath 218.

Detailed Discussion of Repair Process

Figure 6:
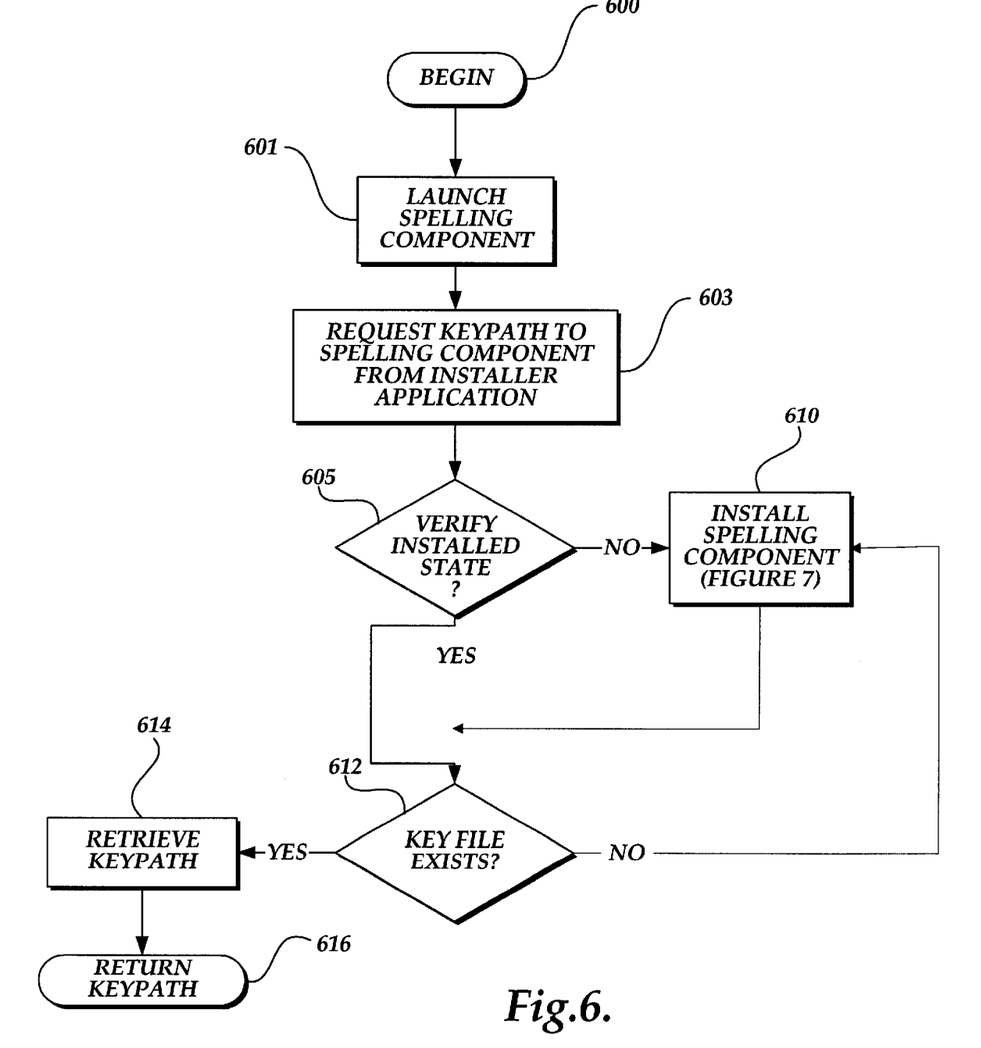
FIG. 6 is a logical flow diagram depicting, in greater detail, a process for verifying the existence of installed resources, and for installing any inadvertently missing resources in accordance with an exemplary embodiment of the present invention.

FIG. 6 is a flow chart which, taken in conjunction with FIG. 3, illustrates a process performed by the installer application 201 of the disclosed embodiment to verify the existence of the installed resources of an application program, such as the Word application 208, and to install any inadvertently missing resources. The process starts at beginning step 600 where the Word application 208 is installed and patched substantially as described above with respect to FIG. 2 and FIG. 3. Processing begins at step 601.

At step 601, the Word application 208 is executing in memory and the user selects a "spell check" option from the menu, causing the Word application 208 to attempt to launch the Spelling Component. Once the user selection is performed, processing continues at step 603.

At step 603, the Word application 208 attempts to launch the Spelling Component by issuing a call to the installer application 201 to return the keypath 218 to the (patched) key file speller2.exe 333 associated with the Spelling Component. The call may take the form of a "Provide Component" call issued to the installer application 201 and having the token 216 as a parameter. As discussed above, the token 216 may include the Product Code, the feature identifier, and the Component Code for the Spelling Component in a format which may be interpreted by the installer application 201. It should be repeated that, although not necessary, the token 216 may have been modified during the patching operation illustrated in FIG. 4 to properly reflect the patched version of key file speller2.exe 333.

In accordance with the disclosed embodiment, the Provide Component call may be interpreted by the installer application 201 as three separate calls. The installer application 201 may respond to the Provide Component call as if a "Use Feature" call, a "Configure Feature" call, and a "Get Component Path" call had been issued. Each of those calls is briefly described below, and the following discussion will assume that each of the three separate calls had been issued when in fact only the Provide Component call was issued. Those skilled in the art will appreciate that a single API call may be interpreted as multiple calls, and the installer application 201 may respond as if each of the multiple calls had been issued independently. Processing continues at step 605.

At step 605, the installer application 201 receives the Provide Component call from the Word application 208 and executes the first portion, the Use Feature call. The installer application 201 responds to the Use Feature call by verifying the installed state of the Spelling Component identified by the token 216. Because components may not function properly individually, the installer application 201 may verify the installed state of each component of the feature identified by the token 216. In response to the Use Feature call, the installer application 201 may attempt to retrieve the keypath 218 associated with the token 216 from the installer registry 202. If the keypath 218 exists in the installer registry 202, then the Spelling Component has been installed, and processing proceeds to decision block 612. It is important to note that although the Spelling Component has been installed, it is possible that a portion of the Spelling Component, such as key file speller2.exe 333, has been inadvertently deleted, as previously discussed. If the keypath 218 does not exist in the installer registry 202, then the Spelling Component has not been installed, and processing continues to step 610.

At step 610, the installer application 201 continues to operate on the Provide Component call by responding to the second portion, the Configure Feature call. In response to the Configure Feature call, the installer application 201 may force the installed state of the Spelling Component. In other words, the installer application 201 installs (or more precisely, reinstalls) the Spelling Component. The installation of the Spelling Component may be automatically performed by the installer application 201 in a background process while the Word application 208 waits. Alternatively, the installer application 201 may conduct negotiations with the Word application 208 to determine whether to automatically install the missing component, or to prompt the user for additional input, or some other method of handling the error.

In the disclosed embodiment, the installer application 201 may be unable to install a single component, in which case the installer application 201 may install a feature containing the Spelling Component. Moreover, if a program file associated with the component has been patched, as is the case with key file speller2.exe 333, the installer application 201 will re-apply the patch to the program file during the installation. The step of installing the Spelling Component is illustrated in detail with respect to FIG. 7 and described below. After the installation of the Spelling Component is complete, processing proceeds to decision block 612.

At decision block 612, the installer application 201 continues processing the Configure Feature call by verifying the existence of key file speller2.exe 333 associated with the Spelling Component. The installer application 201 may query the operating system 35 to verify that key file speller2.exe 333 exists at the location identified by the keypath 218. Those skilled in the art will appreciate that the installer application 201 may perform conventional operating system 35 queries to verify the existence of key file speller2.exe 333 at the location defined by the keypath 218. If key file speller2.exe 333 does not exist at the location identified by the keypath 218, processing returns to step 610 where the installer application 201 installs the Spelling Component. The step of installing the Spelling Component is illustrated with respect to FIG. 7 and described below. If at step 612 the existence of key file speller2.exe 333 is verified, processing continues at step 614.

At step 614, the existence of key file speller2.exe 333 has been verified and the installer application 201 continues to operate on the Provide Component call by responding to the third portion, the GetComponentPath call. In response to the GetComponentPath call, the installer application 201 may perform a simple look-up in the installer registry 202 for the keypath 218 associated with the token 216. By performing the previously-discussed steps, the installation and the existence of key file speller2.exe 333 have been verified. Accordingly, the installer application 201 may merely look up, in the installer registry 202, the token 216 associated with key file speller2.exe 333 and retrieve the keypath 218 associated with that token 216. When the keypath 218 is retrieved, processing continues at step 616.

At step 616, the installer application 201 returns the keypath 218 to the calling application. In this instance, the calling application is the Word application 208, which then instructs the operating system to launch key file speller2.exe 333 at the location identified by the keypath 218. Thus, the executing application is able to continue, following a repair pursuant to the present invention, as though the repair had not been needed. Accordingly, the knowledge required of the user concerning how to run set-up programs or the like to fix the broken feature is greatly reduced.

Figure 7:
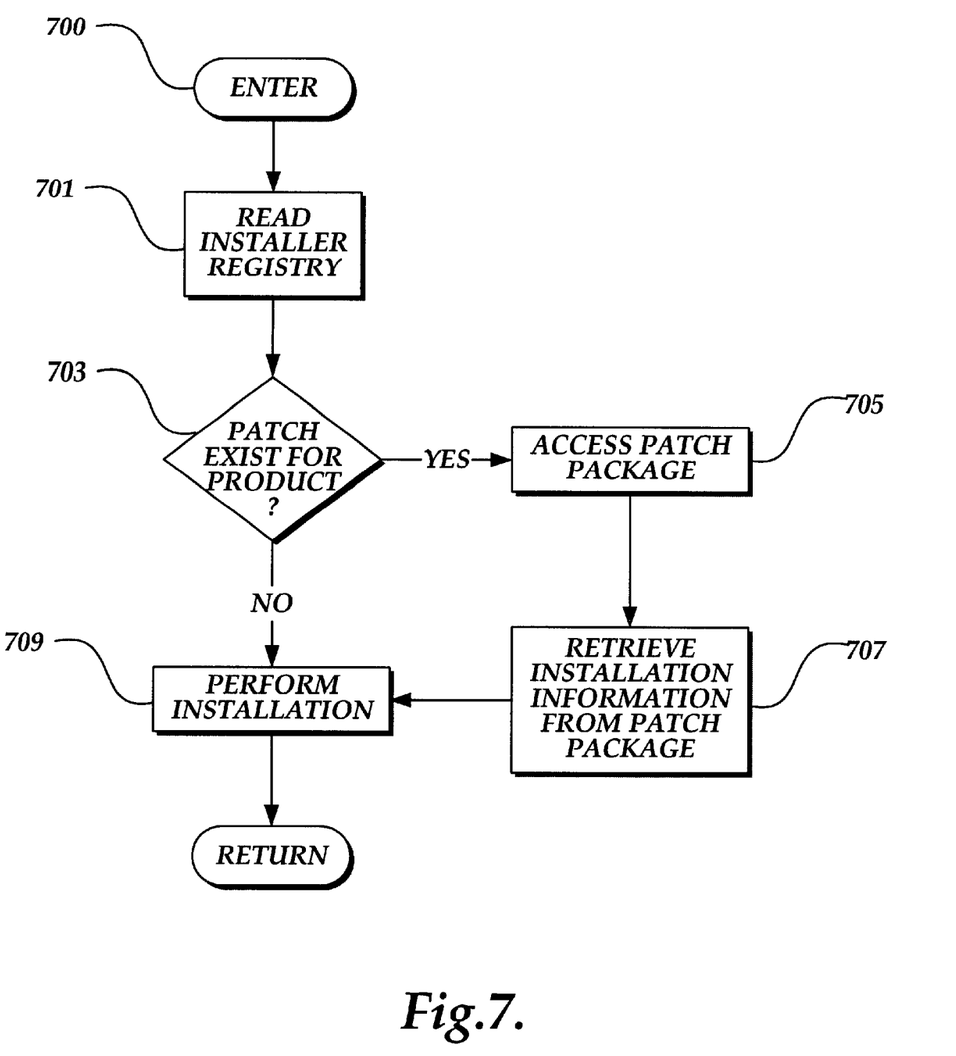
FIG. 7 is a logical flow diagram detailing the steps performed to install an inadvertently missing program file of an installed product.

FIG. 7 is a logical flow diagram depicting a process performed by the installer application 201 of the disclosed embodiment of the invention to install an inadvertently missing program file of an installed product. The process enters from step 700, where a program file associated with a requested component has been identified as missing. Processing continues at step 701.

At step 701, the installer application 201 begins reinstalling the missing program file by first reading the installer registry 202 to ascertain information needed to reinstall the missing program file. The needed information includes a source location from which to install the missing program file, and whether a patch exists that affects the product with which the missing program file is associated. In the disclosed example, key file speller2.exe 333 has been identified as missing. Processing proceeds to decision block 703.

At decision block 703, the installer application determines whether a patch exists which affects the Word product with which the missing key file speller2.exe 333 is associated. If no such patch exists, then processing follows the "no" branch and proceeds to step 709 discussed below. However, in the disclosed example, a patch does exist. As discussed above with respect to FIG. 3, when the patch was applied to the Word product, an entry 310 was stored in the installer registry 202 indicating that the patch has been applied to the Word product. Accordingly, the installer application 201 acknowledges the existence of the patch and processing follows the "yes" branch to step 705.

At step 705, the installer application 201 accesses the patch package 301. As mentioned previously, at step 412 of the flow diagram illustrated in FIG. 4, the installer application 201 stored the patch package 301 to a preconfigured location on the hard disk drive 27 of the computer 20. Accordingly, the installer application 201 opens the patch package 301 at that location. Processing then proceeds to step 707.

At step 707, the installer application 201 uses the information stored within the patch package 301 to determine the operations that must be performed to patch the product. Those operations may include transforming an installation file (not shown) associated with the product to include instructions for applying the patch during an installation procedure. A complete discussion of the operations performed during a patching procedure can be found in U.S. patent application Ser. No. 09/261,864, entitled System and Method for Patching an Installed Application Program, filed concurrently herewith and incorporated herein by reference. For the purpose of this discussion, however, it is sufficient to note that the installer application 201 recognizes the existence of a relevant patch, and applies that patch to the missing program file during reinstallation.

At step 709, the installer application 201 performs an installation (or reinstallation) of the missing file to the location identified in the installer registry 202. In this example, the installation may include reading the original key file speller.exe 230 (FIG. 2) from the source 215, altering that program file with the patch bits from the patch package 301 to create the patched key file speller2.exe 333, and writing the patched key file speller2.exe 333 to the location identified by the keypath 218. It will be appreciated that reinstalling the missing program file may possibly include reinstalling other program files associated with the missing program file. In one example, the installer application 201 may install components of the product rather than individual program files, with each component having more than one associated program file. In that case, at step 709, all program files associated with the component, including the missing program file, are reinstalled. After the missing program file is reinstalled, control proceeds to step 711 where processing returns to FIG. 5 or FIG. 6.

From a reading of the above description pertaining to the disclosed embodiments of the present invention, other modifications and variations thereto may become apparent to those skilled in the art. Therefore, the scope of the present invention is to be limited only by the following claims.

The embodiments of the invention in which an exclusive property or privilege is claimed are defined as follows:

1. A computer-readable medium having computer-executable instructions for repairing an application program that has become damaged, which when executed comprises:

receiving an indication that a resource operative to provide functionality to the application program is needed by the application program;

verifying that the resource is available to the application program at an expected location;

in response to a positive verification of the availability of the resource to the application program at the expected location, passing an existence verification to the application program;

in response to a failure to verify the availability of the resource to the application program at the expected location, determining if a patch exists for patching the application program;

in response to a positive determination that the patch exists for patching the application program, accessing the patch to retrieve information for applying the patch to the application program;

installing the resource at the expected location; and applying the patch to the resource.

2. The computer-readable medium of claim 1, wherein the step of verifying the availability of the resource occurs in a background process while the application program awaits the result of the verification.

3. The computer-readable medium of claim 1, wherein:

the expected location of the resource is described by a resource path; and the existence verification comprises the resource path.

4. The computer-readable medium of claim 1, wherein the determining if the patch exists step comprises reading from an installer registry information describing the resources installed for the application program.

5. The computer-readable medium of claim 4, wherein the information describing the resources further comprises patch information describing the existence of a patch associated with the application program.

6. The computer-readable medium of claim 1, wherein the accessing the patch step comprises reading installation information contained in the patch to identify instructions for execution by an installer application to apply the patch to the resource.

7. A computer-implemented method for reinstalling a resource of an application program, the resource having been patched, comprising:

accessing an installer registry to identify an expected location for the resource, the installer registry containing the expected location for the resource, an indication that a patch exists, and an indication that the resource is affected by the patch;

verifying the existence of the resource at the expected location;

in response to a failure to verify the existence of the resource at the expected location, installing the resource to the expected location; and applying the patch to the resource.

8. The computer-implemented method of claim 7, wherein the step of installing the resource to the expected location incorporates the step of applying the patch to the resource such that the resource is patched when it is installed.

9. The computer-implemented method of claim 7, wherein the step of applying the patch to the resource comprises altering a program file associated with the resource to include patch bits.

10. The computer-implemented method of claim 9, wherein the patch bits comprise substitute information to replace existing information within the program file.

11. The computer-implemented method of claim 8, wherein the resource is replaced with a new resource associated with the patch when it is installed.

12. A computer-readable medium having computer-executable instructions for ensuring that a program file is available to an application program, which when executed perform steps comprising:

storing an indication that a patch exists and that the program file is affected by the patch;

in response to a need for the program file, verifying the existence of the program file at an expected location;

in response to a failure to verify the existence of the program file at the expected location, patching the program file and installing the program file to the expected location.

13. The computer-readable medium of claim 12, wherein the storing an indication step comprises writing at least one entry in an installer registry maintained by an installation application and used to store configuration information of the application program, the configuration information including the expected location of the program file.

14. The computer-readable medium of claim 13, wherein the verifying the existence step comprises reading from the installer registry the expected location of the program file and determining if the program file exists at the expected location.

15. The computer-readable medium of claim 12, wherein the patching the program file step comprises reading a patch file containing instructions for patching the program file during the installing the program file step.

16. The computer-readable medium of claim 12, wherein the patching the program file step is performed as the program file is being installed to the expected location during the installing the program file step.

* * * * *